Figure 1:
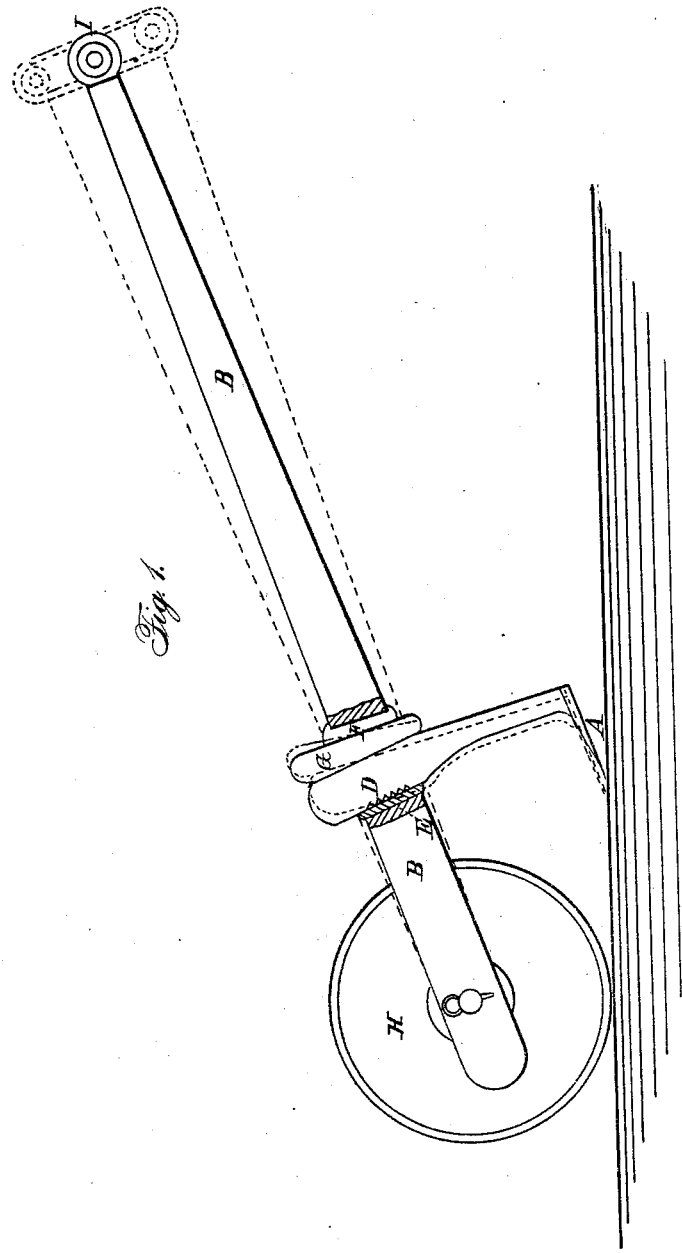

C. CROFUT.
Hoe.

No. 49,985. Patented Sept 19, 1865.

Witnesses:

Inventor:
Charles Crofut

UNITED STATES PATENT OFFICE.

CHARLES CROFUT, OF WESTON, CONNECTICUT.

IMPROVEMENT IN WEEDING-HOES.

Specification forming part of Letters Patent No. 49,985, dated September 19, 1865.

*To all whom it may concern:*

Be it known that I, CHARLES CROFUT, of the town of Weston, county of Fairfield, and State of Connecticut, have invented a new and useful Improvement in the Mode of Constructing Adjustable Weeding-Hoes; and I do hereby declare that the following is a correct description of the same, reference being had to the accompanying drawing, and to the letters of reference marked thereon.

The nature of my invention consists in the mechanical arrangement of a device for adjusting the position of the blade of the hoe to accommodate the working operator.

To enable others skilled in the art to make and use my invention, I will proceed to describe the same.

In the drawing, Figure 1 is a side view of the hoe, with a portion of the beam removed to show the adjusting arrangement.

The general construction, form, and arrangement of my weeding-hoe is substantially the same and similar to various others, as shown in the drawing.

My improvements are in the mode of adjusting the blade and beam to suit the various persons operating the same and the circumstances which sometimes require the handle to be raised or lowered, so that the blade will work properly by a short or tall person.

In the solid part of the beam B, near the forward wheel, H, I form an oblong mortise or slot to receive the stem D of the blade A and the gibs E and F and the fastening-wedge G.

The gib E is formed with one, two, or more serrated teeth on the edge which goes next to the head of the stem D, as shown in the drawing. These teeth correspond with several teeth which are formed on the edge of the stem-head D. The object of these teeth is to hold the head D firmly in its place in whatever position or height the same may be required when adjusted.

When the head D is adjusted to its proper height, and the teeth are in their place, the plain gib F is inserted in its place, and the wedge or key G is driven in between them to fasten the whole in a firm manner for operation.

If it is found that the handle I of the beam B is too high or too low for the person to work the hoe properly, take out the key G and relieve the teeth of the head D from the teeth of the gib E, and pass the stem up or down, as the case may require, for either raising or lowering the handle I and the blade A, then pass in the key again as before, and the whole is adjusted for working properly. When it is found the blade A is inclined too much, take out the two gibs E and F and reverse them, as shown by the dotted lines in the drawing, and it will throw the blade to a more level position, which in many cases will be necessary. The flat and oblong shape of the stem-head D at the part which enters the slot in the beam prevents any side movement or turning of the hoe-blade A when working.

I do not claim as new the slot in the beam or wheel, or beam or handle.

What I claim as my invention, and desire to secure by Letters Patent, is—

The adjustable arrangement of the serrated gib E and stem D with the plain gib F and key G, in the manner and for the purpose substantially as herein described.

CHARLES CROFUT.

Witnesses:
WM. VINE,
A. C. ARNOLD.